ated to said crank arms...

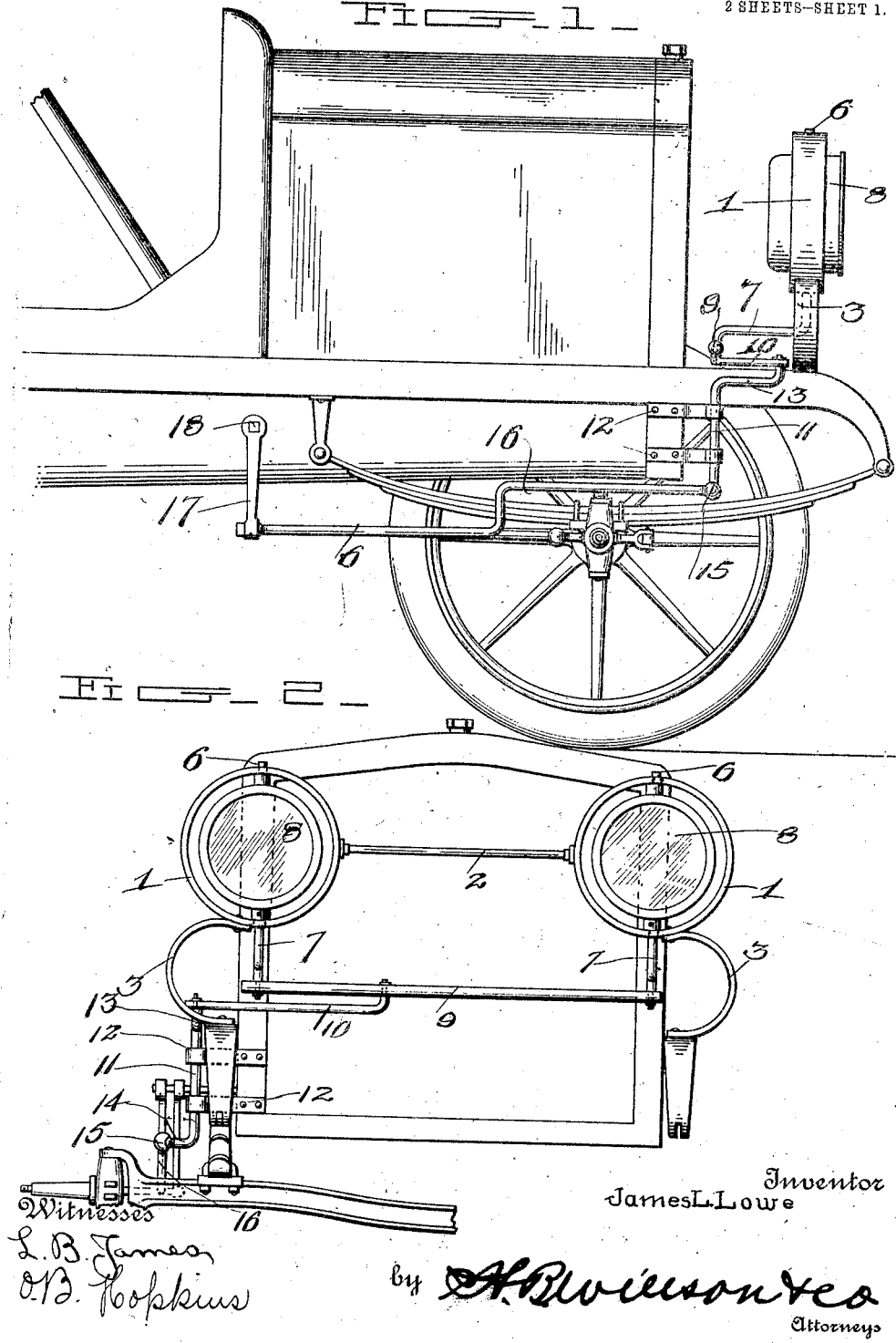

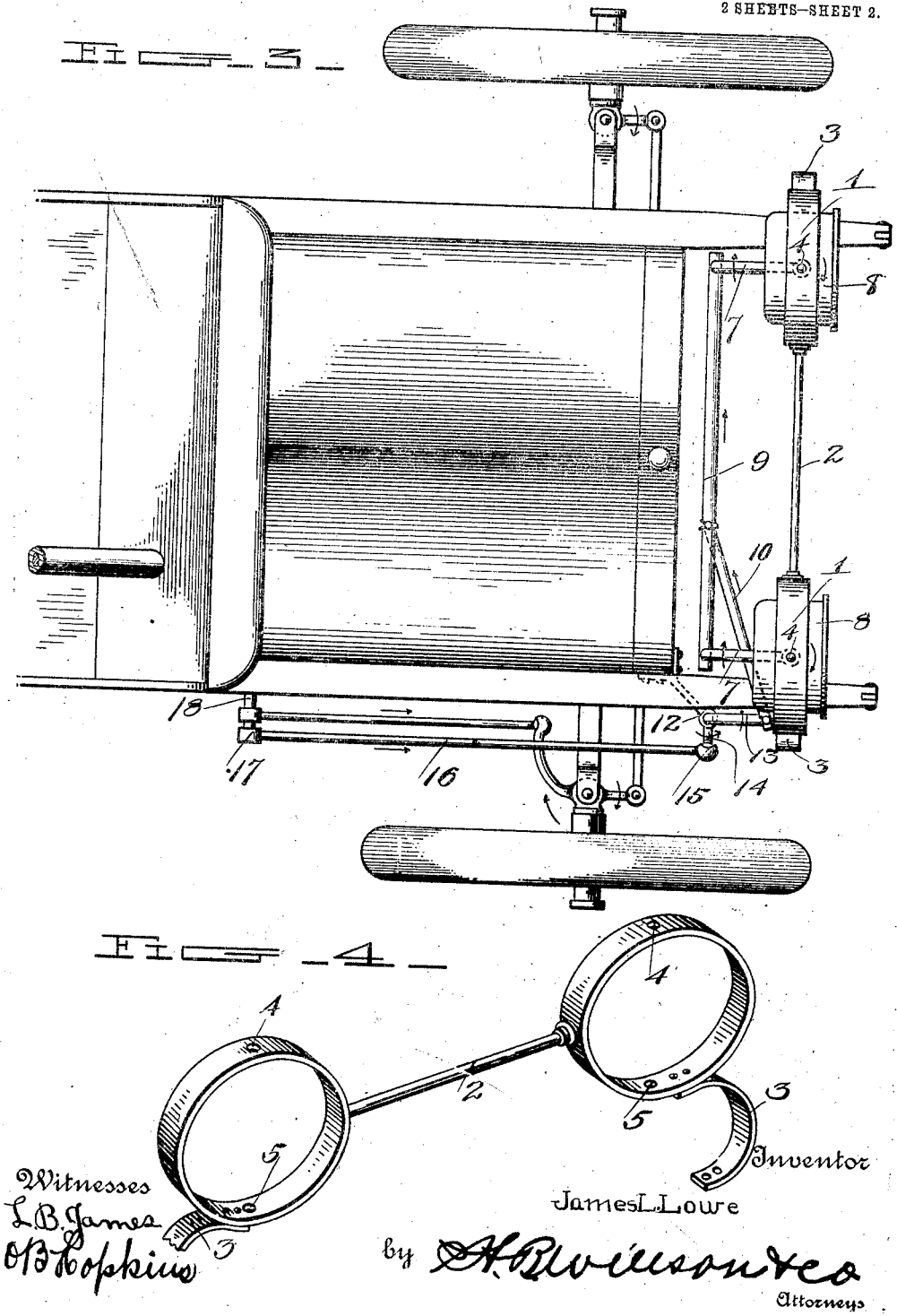

UNITED STATES PATENT OFFICE.

JAMES L. LOWE, OF MOORE, MONTANA.

DIRIGIBLE HEADLIGHT.

1,007,880.  Specification of Letters Patent.  Patented Nov. 7, 1911.

Application filed November 29, 1910. Serial No. 594,625.

*To all whom it may concern:*

Be it known that I, JAMES L. LOWE, a citizen of the United States, residing at Moore, in the county of Fergus and State of Montana, have invented certain new and useful Improvements in Dirigible Headlights; and I do declare the following to be a full, clear, and exact description of the invention, such as will enable others skilled in the art to which it appertains to make and use the same.

This invention relates to improvements in dirigible head lights.

One object of the invention is to provide a head light having an improved construction and arrangement of supporting and operating mechanism whereby the same is connected to and operated by steering mechanism of the vehicle to turn the lights in the direction the steering wheels are turned and simultaneously with the movement thereof.

With this and other objects in view, the invention consists of certain novel features of construction, combination and arrangement of parts as will be more fully described and particularly pointed out in the appended claims.

In the accompanying drawings: Figure 1 is a side view of the front end of an automobile with the near steering wheel removed, and showing the application of the invention thereto; Fig. 2 is a front end view thereof with parts broken away and omitted; Fig. 3 is a top plan view of the same; Fig. 4 is a detail perspective view of the lamp supporting frames.

Referring more particularly to the drawings, 1 denotes the supporting frames for the lamps, said frames being connected together by a cross bar or rod 2 and firmly secured to a suitable portion of the front end of the frame by curved supporting and attaching plates 3. In the upper and lower sides of the frames 1 are formed upper and lower alined bearing passages 4 and 5. With the upper passages 4 are revolubly engaged upper pivot pins 6 and with the lower passages 5 are engaged crank arms 7 of the lamps 8.

The crank arms 7 project rearwardly and are pivotally secured to a connecting rod 9. The rod 9 is pivotally connected by a link 10 with a vertically disposed crank shaft 11 which is revolubly mounted in bearing brackets 12 secured to the frame of the machine. On the upper end of the crank shaft is formed a crank arm 13 to which is pivotally connected the adjacent end of link 10. On the lower end of the crank shaft 11 is formed a crank arm 14.

The crank arm 14 has a ball and socket or a universal joint connection 15 with the forward end of an operating rod 16 the rear end of which is connected to a crank arm 17 fixedly mounted on the shaft 18 of the steering apparatus as shown. By thus connecting the lamp operating rods and levers to the steering shaft the lamps will be simultaneously turned with and in the same direction in which the steering wheels are turned.

While the invention is herein shown and described as being connected to the steering gear of an automobile it is obvious that I may apply and operatively connect the same to the steering mechanism or other movable part of any vehicle whereby the lamps will be turned in the direction the vehicle is traveling.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined in the appended claims.

Having thus described my invention what I claim is:—

1. In a dirigible head light for vehicles, a lamp supporting frame, means for attaching the latter to a vehicle, a lamp pivotally mounted in the frame, a crank arm secured to said lamp, a vertically disposed crank shaft revolubly mounted on the frame of the vehicle, arms projecting from the upper and lower ends of said shaft, means for connecting the upper arm of the shaft with the crank arm of the lamp, and an operating rod having a universal joint connection at one end with the lower crank arm of the shaft and means to operatively connect the opposite end of said operating rod with the steering shaft of the vehicle.

2. In a dirigible head light for vehicles, lamp supporting frames, attaching plates to secure said frames to the vehicle, a rod to connect said frames together, lamps pivotally mounted in said frames, crank arms secured to said lamps, a connecting bar pivotally secured at its opposite ends to said crank arms whereby the latter are connected together to turn said lamps in unison, a double, pivotally mounted crank shaft, a link to connect the upper crank arm of said shaft to said connecting bar, an operating rod having a universal joint connection at one end with the lower crank arm of said shaft, and a crank arm adapted to operatively connect the opposite end of said operating rod with the steering shaft of the vehicle.

In testimony whereof I have hereunto set my hand in presence of two subscribing witnesses.

JAMES L. LOWE.

Witnesses:
 PATRICK NIHILL,
 V. RUSSELL HENRY.